United States Patent
Choi (10) Patent No.: US 9,470,281 B2
(45) Date of Patent: Oct. 18, 2016

(54) ASSEMBLY DEVICE FOR PARKING CABLE

(71) Applicant: HYUNDAI MOBIS CO., LTD., Seoul (KR)

(72) Inventor: Moo Jin Choi, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 56 days.

(21) Appl. No.: 14/535,242

(22) Filed: Nov. 6, 2014

(65) Prior Publication Data

US 2015/0362030 A1  Dec. 17, 2015

(30) Foreign Application Priority Data

Jun. 12, 2014 (KR) .................. 10-2014-0071609

(51) Int. Cl.
| | | |
|---|---|---|
| *F16C 1/10* | (2006.01) | |
| *F16D 65/14* | (2006.01) | |
| *B60T 11/18* | (2006.01) | |
| *F16D 125/62* | (2012.01) | |

(52) U.S. Cl.
CPC .............. *F16D 65/14* (2013.01); *B60T 11/18* (2013.01); *F16C 1/101* (2013.01); *F16D 2125/62* (2013.01); *Y10T 74/20462* (2015.01)

(58) Field of Classification Search
CPC .... F16D 65/14; F16D 2125/62; F16C 1/101; B60T 7/07; B60T 7/08; B60T 7/108; B60T 13/743; B60T 13/746
USPC ......... 188/2 D, 156, 171; 74/500.5, 501.5 R, 74/502.4, 502.6
See application file for complete search history.

(56) References Cited

U.S. PATENT DOCUMENTS

| | | | | |
|---|---|---|---|---|
| 4,838,109 A | * | 6/1989 | Stewart .................. | B60T 7/108 188/2 D |
| 5,180,038 A | * | 1/1993 | Arnold .................. | B60T 13/743 188/171 |
| 5,590,744 A | * | 1/1997 | Belmond ................ | B60T 7/107 188/2 D |
| 5,937,705 A | * | 8/1999 | Corbett .................... | F16C 1/14 74/501.5 R |
| 5,983,745 A | * | 11/1999 | Petrak ...................... | B60T 7/08 188/2 D |
| 6,840,133 B2 | * | 1/2005 | Aubrey ................ | B60T 11/046 188/2 D |
| 7,779,968 B2 | * | 8/2010 | Noh ........................ | B60T 7/107 188/156 |

(Continued)

FOREIGN PATENT DOCUMENTS

| | | |
|---|---|---|
| JP | 2011-196523 A | 10/2011 |
| KR | 10-2011-0038290 A | 4/2011 |

(Continued)

OTHER PUBLICATIONS

Office Action dated Feb. 4, 2015 of corresponding Korean Patent Application No. 10-2014-0071609—4 pages.

*Primary Examiner* — Christopher Schwartz

(74) *Attorney, Agent, or Firm* — Knobbe Martens Olson & Bear, LLP (57) ABSTRACT

An assembly device for a parking cable may include: a driving cable part having one end connected to a driving unit; a braking cable part having one end connected to a braking unit; a first coupling part coupled to the other end of the driving cable part; and a second coupling part coupled to the other end of the braking cable part and screw-coupled to the first coupling part. A distance between the other end of the driving cable part and the other end of the braking cable part may be adjusted according to the extent to which the first and second coupling parts are screwed coupled to each other.

20 Claims, 10 Drawing Sheets

(56) References Cited

U.S. PATENT DOCUMENTS

| | | | |
|---|---|---|---|
| 8,235,181 B2* | 8/2012 | Sano | B60T 13/746 188/156 |
| 2008/0135355 A1* | 6/2008 | Jeon | B60T 13/746 188/156 |

FOREIGN PATENT DOCUMENTS

| KR | 10-2011-0132919 A | 12/2011 |
|---|---|---|
| KR | 10-2012-0136835 A | 12/2012 |
| KR | 10-2012-0137034 A | 12/2012 |

\* cited by examiner

ASSEMBLY DEVICE FOR PARKING CABLE

CROSS-REFERENCES TO RELATED APPLICATIONS

The present application claims priority to Korean application number 10-2014-0071609, filed on Jun. 12, 2014, which is incorporated by reference in its entirety.

BACKGROUND

The present disclosure relates to an assembly device for a parking cable, and more particularly, to an assembly device for a parking device, which is capable of reducing volume by suppressing a stroke allowed for assembling a parking cable, and releasing a braking force during emergency.

Generally, in an electronic parking brake system, a motor is used to operate a parking brake. An electric parking brake system is disclosed in Korean Patent Laid-open Publication No. 2011-0038290 published on Apr. 14, 2011 and entitled "Locking Preventing Apparatus for Electronic Parking Brake".

SUMMARY

Embodiments of the present invention are directed to an assembly device for a parking cable, which is capable of suppressing an invalid stroke while improving the assembly of a parking cable, and releasing a braking force through a simple operation during emergency.

In one embodiment, an assembly device for a parking cable may include: a driving cable part having one end connected to a driving unit; a braking cable part having one end connected to a braking unit; a first coupling part coupled to the other end of the driving cable part; and a second coupling part coupled to the other end of the braking cable part and screw-coupled to the first coupling part. A distance between the other end of the driving cable part and the other end of the braking cable part may be adjusted according to the extent to which the first and second coupling parts are screwed coupled to each other.

The first coupling part may include: a bolt body coupled to the driving cable part and having a screw thread formed on the outer surface thereof; and a bolt head formed on the bolt body so as to protrude in a lateral direction, and having a polygonal shape.

The second coupling part may include: a parking locking part coupled to the other end of the braking cable part; and a parking nut part to which the parking locking part is locked and fixed, and into which the first coupling part is inserted and screw-coupled, and a distance between the parking nut part and the driving cable part may be adjusted according to the rotation direction of the parking nut part.

The assembly device may further include an anti-rotation part engaged with the first coupling part and the parking nut part so as to restrict the rotation of the parking nut part.

The anti-rotation part may have a releasing cable connected thereto.

The anti-rotation part may include: an anti-rotation cover through which the driving cable part is passed, and which is arranged to surround the first coupling part and the parking nut part; a cover groove which is formed on the inner surface of the anti-rotation cover, and into which a bolt protrusion formed on the first coupling part is inserted to guide the movement of the anti-rotation cover; and a cover hole which is formed at an end of the anti-rotation cover, and into which a nut protrusion formed on the parking nut part is inserted.

The parking locking part may include: a locking body coupled to the braking cable part and inserted into the parking nut part; and a locking head formed on the locking body so as to protrude in a lateral direction, and locked to the inner surface of the parking nut part.

The parking nut part may include: a nut body through which the braking cable is passed, of which the outside is formed in a polygonal shape, and of which the inside is screw-coupled to the first coupling part; and a locking protrusion protruding from the inner surface of the nut body, and locked to the locking head.

The second coupling part may include: a parking locking part coupled to the other end of the braking cable part; a parking nut part to which the parking locking part is locked and fixed, and into which the first coupling part is inserted and screw-coupled, and a distance between the parking nut part and the driving cable part is adjusted according to the rotation direction of the parking nut part.

The assembly device may further include an anti-rotation part engaged with the first coupling part and the parking nut part so as to restrict the rotation of the parking nut part.

The anti-rotation part may have a releasing cable connected thereto.

The anti-rotation part may include: an anti-rotation cover through which the driving cable part is passed, and which is arranged to surround the first coupling part and the parking nut part; a cover groove which is formed on the inner surface of the anti-rotation cover, and into which a bolt protrusion formed on the first coupling part is inserted to guide the movement of the anti-rotation cover; and a cover hole which is formed at an end of the anti-rotation cover, and into which a nut protrusion formed on the parking nut part is inserted.

The cover groove may be formed in the longitudinal direction of the anti-rotation cover.

The nut protrusion may include: a protrusion body protruding from the parking nut part and inserted into the cover hole; and a protrusion head formed at an end of the protrusion body, and contacted with the anti-rotation cover.

The nut protrusion may be formed of an elastic material, and forced to be inserted into the cover hole.

The anti-rotation cover, the cover groove, and the cover hole may be integrated with each other.

The anti-rotation part may further include a cable fixing groove which is concavely formed in the anti-rotation cover and to which the releasing cable is coupled.

The releasing cable may be detachably coupled to the cable fixing groove.

The parking locking part may include: a locking body coupled to the braking cable part and inserted into the parking nut part; and a locking head formed on the locking part so as to protrude in a lateral direction, and locked to the inner surface of the parking nut part.

The parking nut part may include: a nut body through which the braking cable is passed, of which the outside is formed in a polygonal shape, and of which the inside is screw-coupled to the first coupling part; and a locking protrusion protruding from the inner surface of the nut body, and locked to the locking head.

DESCRIPTION OF SPECIFIC EMBODIMENTS

Hereinafter, an assembly device for a parking cable in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Generally, in an electronic parking brake system, when a motor is rotated to generate a driving force, a decelerator performs boosting and deceleration to rotate a screw, while a plurality of gears thereof are rotated. Then, a nut coupled to the screw is linearly moved to pull a parking cable such that a vehicle is parked.

One end of the parking cable is connected to the nut coupled to the screw, and the other end of the parking cable is connected to a vehicle brake system. The parking cable has an invalid stroke for smooth assembly of the parking cable.

However, since a space corresponding to the invalid stroke is required to assemble the parking cable, the volume of the module may be increased. Furthermore, when the electronic parking brake system is discharged or broken down, it is inconvenient to release the parked state during emergency.

Figure 1:
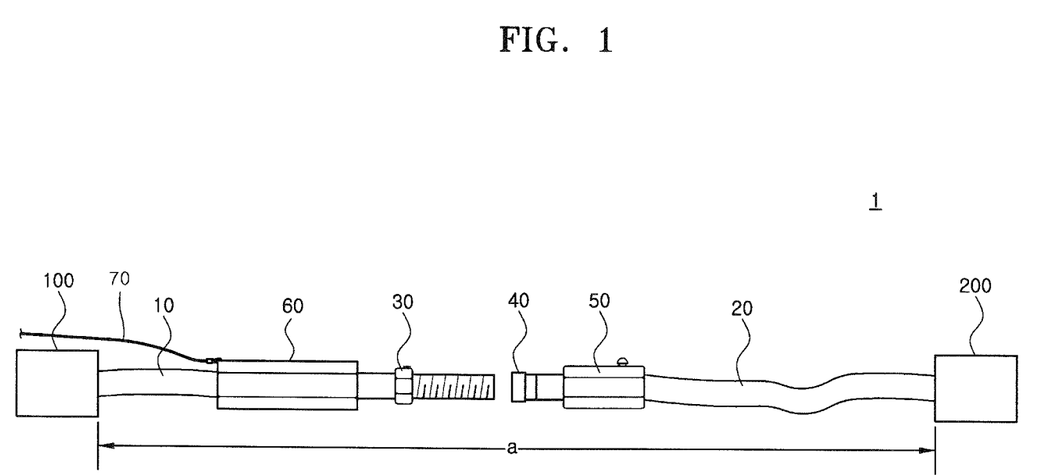
FIG. 1 schematically illustrates a state before a parking cable is connected to an assembly device for a parking cable in accordance with an embodiment of the present invention.

FIG. 1 schematically illustrates a state before a parking cable is connected to an assembly device for a parking cable in accordance with an embodiment of the present invention.

Figure 2:
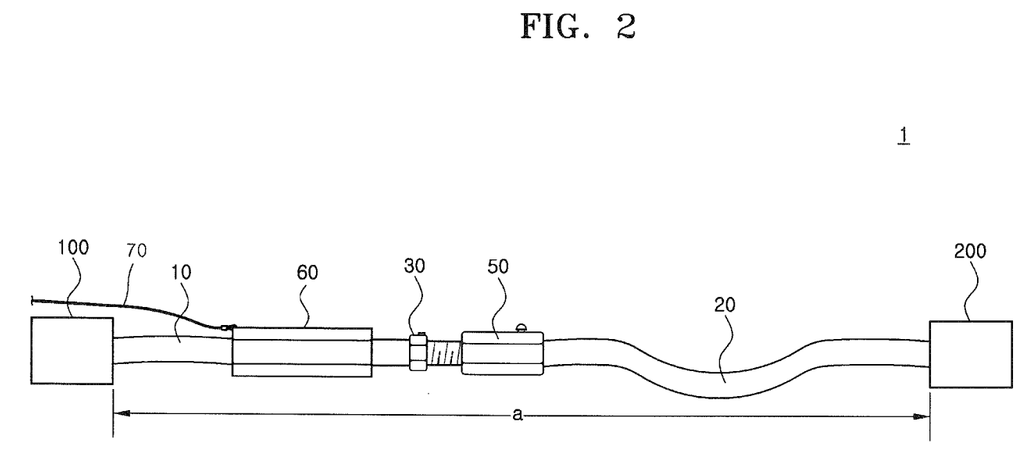
FIG. 2 schematically illustrates a state in which the parking cable is connected to the assembly device for a parking cable in accordance with the embodiment of the present invention.

FIG. 2 schematically illustrates a state in which the parking cable is connected to the assembly device for a parking cable in accordance with the embodiment of the present invention.

Figure 3:
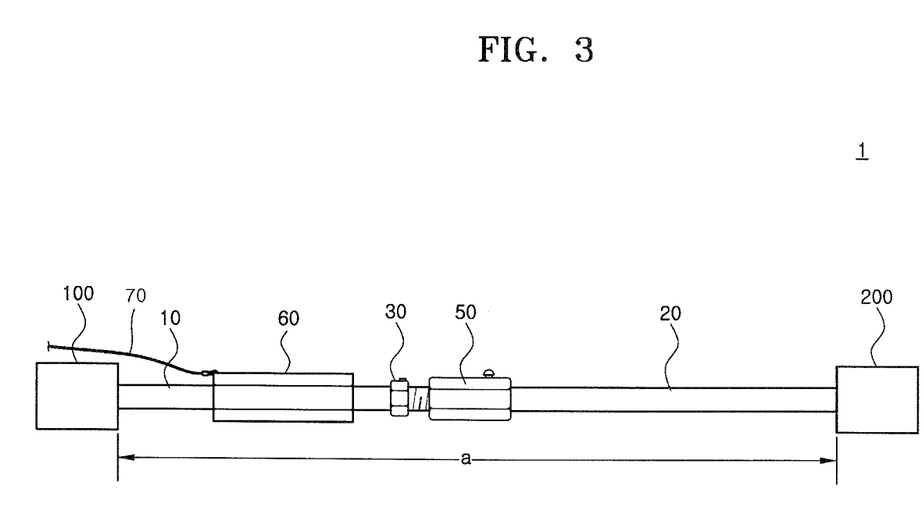
FIG. 3 schematically illustrates a state in which the length of the parking cable of FIG. 2 is reduced to remove an invalid stroke.

FIG. 3 schematically illustrates a state in which the length of the parking cable of FIG. 2 is reduced to remove an invalid stroke.

Figure 4:
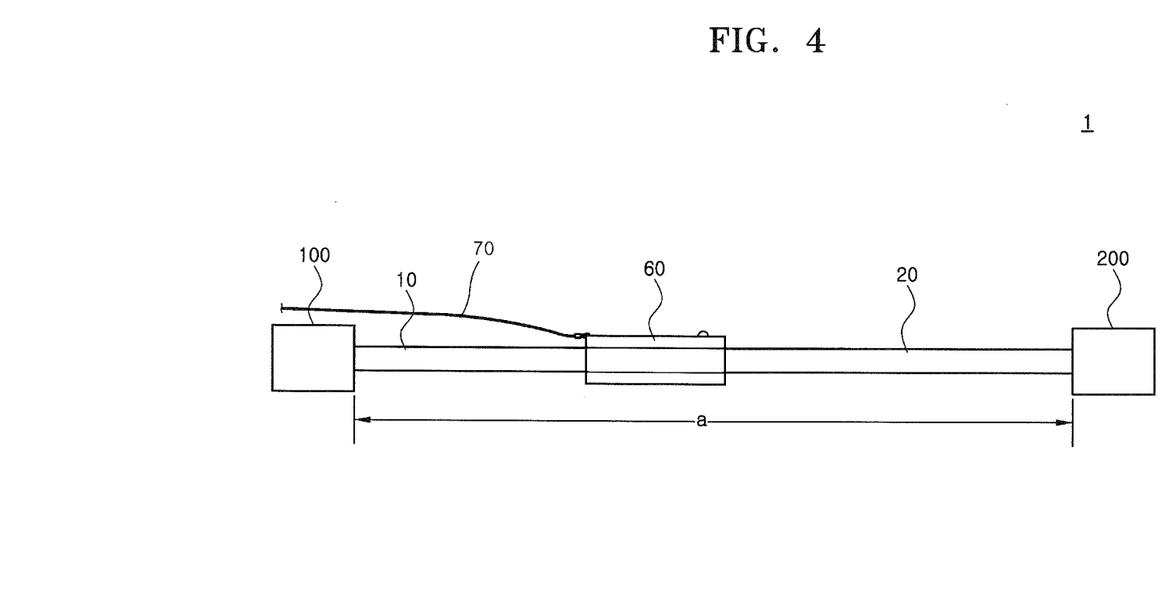
FIG. 4 schematically illustrates a state in which an anti-rotation part is moved to restrict rotation of a parking nut part in FIG. 3.

FIG. 4 schematically illustrates a state in which an anti-rotation part is moved to restrict rotation of a parking nut part in FIG. 3.

Referring to FIGS. 1 to 4, the assembly device 1 for a parking cable in accordance with the embodiment of the present invention may include a driving cable part 10, a braking cable part 20, a first coupling part 30, a second coupling part 40 and 50, and an anti-rotation part 60. At this time, the length (a) of the parking cable may indicate a length when all the components are coupled.

The driving cable part 10 may have one end connected to a driving unit 100. When a parking brake (not illustrated) is operated, the driving unit 100 may pull the driving cable part 10 through a manual or electric motor.

The braking cable part 20 may have one end connected to a braking unit 200. The braking unit 200 may correspond to a brake pad of a vehicle wheel. When the driving cable part 10 is moved by the driving unit 100, the braking cable part 20 may generate a braking force by closely attaching the brake pad on the wheel.

The first coupling part 30 may be coupled to the other end of the driving cable part 10. For example, the first coupling part 30 may surround the other end of the driving cable part 10, and maintain the connection state with the driving cable part 10 through a press fitting process.

The second coupling part 40 and 50 may be coupled to the other end of the braking cable part 20, and screw-coupled to the first coupling part 30. Thus, according to the extent to which the first coupling part 30 and the second coupling part 40 and 50 are screw-coupled to each other, the distance between the other end of the driving cable part 10 and the other end of the braking cable part 20 may be adjusted. When the distance is adjusted, it may indicate that the length (a) of the parking cable is adjusted. In the present embodiment, the second coupling part 40 and 50 may include a parking locking part 40 and a parking nut part 50.

The parking locking part 40 may be coupled to the other end of the braking cable part 20. For example, the parking locking part 40 may surround the other end of the braking cable part 20, and maintain the connection state with the braking cable part 20 through a press fitting process.

The parking nut part 50 may have a tube shape through which the braking cable part 20 is passed. The parking locking part 40 may be locked to the inside of the parking nut part 50 such that the parking nut part 50 maintains the connection state with the braking cable part 20. The first coupling part 30 may be inserted into the parking nut part 50 so as to be screw-coupled to the parking nut part 50.

Thus, the distance between the parking nut part 50 and the other end of the driving cable part 10 may be adjusted according to the rotation direction of the parking nut unit 50, in a state where the parking nut part 50 and the first coupling part 30 are coupled to each other. Ultimately, the length (a) of the parking cable may be adjusted according to the rotation direction of the parking nut part 50.

The anti-rotation part 60 may be formed to surround the first coupling part 30 and the parking nut part 50, and the outer surfaces of the first coupling part 30 and the parking nut part 50 may be engaged with the inner surface of the anti-rotation part 50 to restrict the rotation of the parking nut part 50.

The anti-rotation part 60 may have a releasing cable 70 connected thereto. In the present embodiment, the releasing cable 70 may include a metallic material, and have one end coupled to the anti-rotation part 60 and the other end positioned at a driver's seat or the like, such that a driver pulls the releasing cable 70 to release a parked state.

Figure 5:
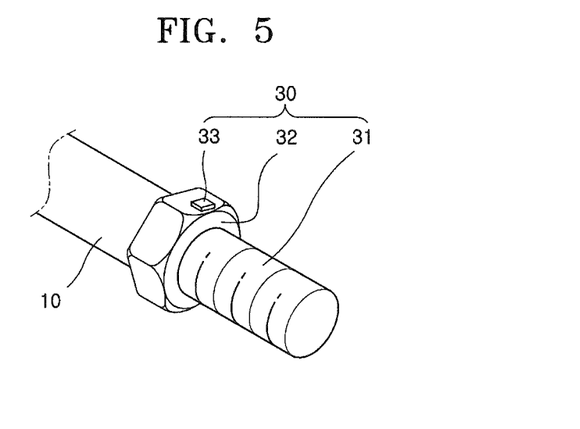
FIG. 5 schematically illustrates a first coupling part in the assembly device for a parking cable in accordance with the embodiment of the present invention.

FIG. 5 schematically illustrates the first coupling part in the assembly device for a parking cable in accordance with the embodiment of the present invention.

Referring to FIG. 5, the first coupling part 30 in accordance with the embodiment of the present invention may include a bolt body 31 and a bolt head 32.

The bolt body 31 may be coupled to the other end of the driving cable part 10, and formed in a cylindrical shape. The bolt body 31 may have a screw thread formed thereon so as to be coupled to the parking nut part 50. The bolt head 32 may be formed on the bolt body 31 so as to protrude from the bolt body 31, and have a polygonal shape. Thus, although the bolt body 31 is inserted into the anti-rotation part 60, the bolt head 32 may be engaged with the inner surface of the anti-rotation part 60. For example, the bolt head 32 may be formed at the left end of the bolt body 31 (based on FIG. 5).

Figure 6:
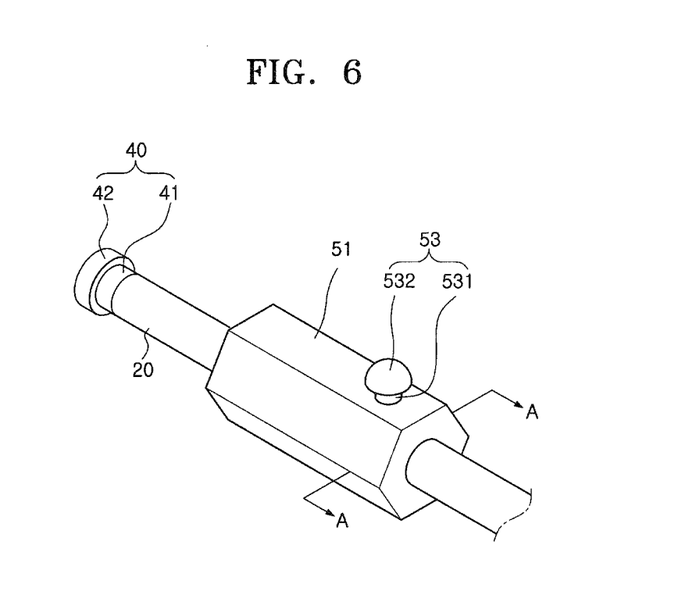
FIG. 6 schematically illustrates a parking locking part and a parking nut part in the assembly device for a parking cable in accordance with the embodiment of the present invention.
Figure 7:
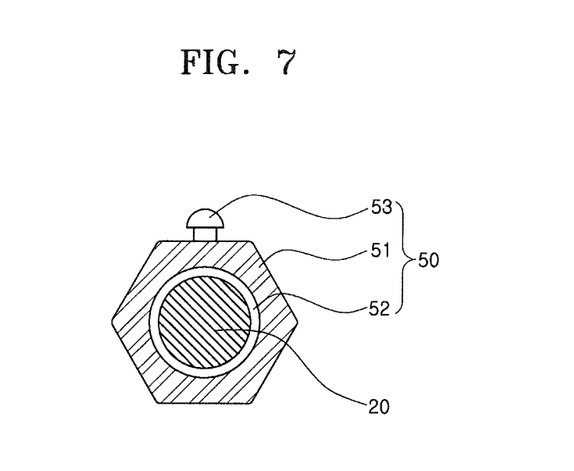
FIG. 7 is an A-A cross-sectional view of FIG. 6.

FIG. 6 schematically illustrates the parking locking part and the parking nut part in the assembly device for a parking cable in accordance with the embodiment of the present invention. FIG. 7 is an A-A cross-sectional view of FIG. 6.

Referring to FIGS. 6 and 7, the parking locking part 40 in accordance with the embodiment of the present invention may include a locking body 41 and a locking head 42, and the parking nut part 50 may include a nut body 51 and a locking protrusion 52.

The locking body 41 may be coupled to the braking cable part 20, and inserted into the parking nut part 50. The locking head 42 may be formed on the locking body 41, and protrude from the locking body 41. For example, the locking head 42 may be formed at the left end of the locking body 41 (based on FIG. 6).

The nut body 51 may have a tube shape through which the braking cable part 20 is passed. The nut body 51 may have a polygonal shape so as to be engaged with the inner surface of the anti-rotation part 60. The nut body 51 may have a screw thread formed therein so as to be coupled to the bolt body 31 of the first coupling part 30. The locking protrusion 52 may protrude from the inner surface of the nut body 51 such that the locking head 42 is locked to the locking protrusion 52. Thus, the parking nut part 50 and the parking locking part 40 may maintain the connection state. For example, the locking protrusion 52 may be formed at the right end of the nut body 51 (based on FIG. 6).

Figure 8:
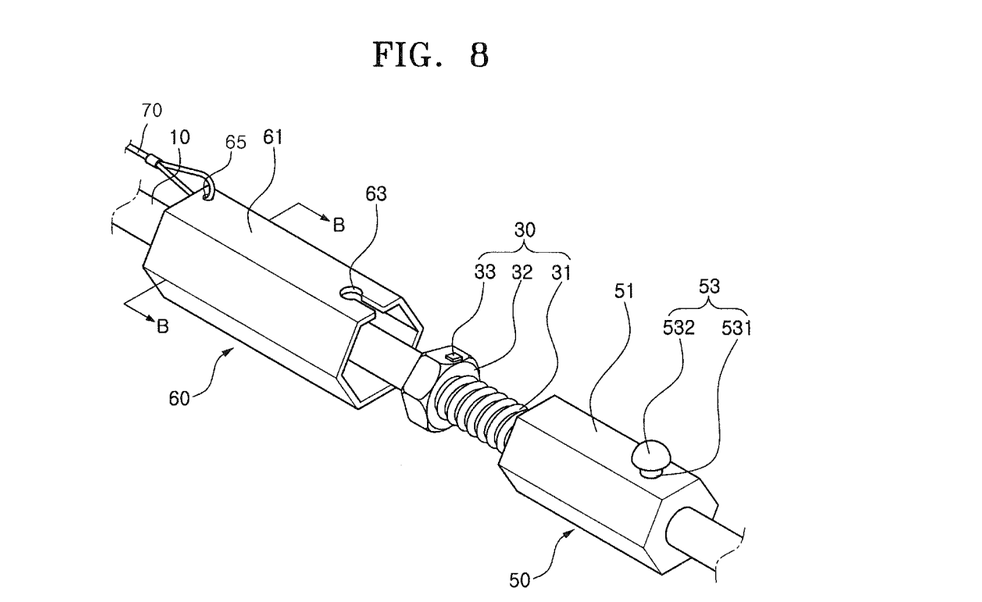
FIG. 8 schematically illustrates the anti-rotation part in the assembly device for a parking cable in accordance with the embodiment of the present invention.
Figure 9:
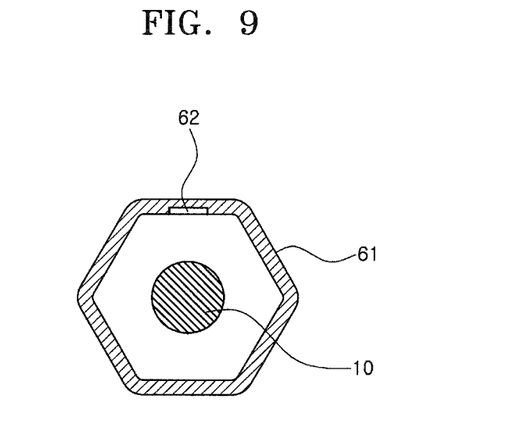
FIG. 9 is a B-B cross-sectional view of FIG. 8.

FIG. 8 schematically illustrates the anti-rotation part in the assembly device for a parking cable in accordance with the embodiment of the present invention. FIG. 9 is a B-B cross-sectional view of FIG. 8.

Referring to FIGS. 8 and 9, the anti-rotation part 60 in accordance with the embodiment of the present invention may include an anti-rotation cover 61, a cover groove 62, a cover hole 63, and a cable fixing groove 65.

The anti-rotation cover 61 may have a tube shape through which the driving cable part 10 is passed. The anti-rotation cover 61 may be arranged to surround the first coupling part 30 and the parking nut part 50. For example, the bolt head 32 and the nut body 51 may be formed in a polygonal shape, and have the same outer diameter. Furthermore, the anti-rotation cover 61 may be formed in a polygonal shape corresponding to the outer surfaces of the bolt head 32 and the nut body 51, and have an outer diameter corresponding to the outer diameters of the bolt head 32 and the nut body 51. Thus, since the first coupling part 30 and the parking nut part 50 are engaged with the inside of the anti-rotation cover 61, the rotations of the first coupling part 30 and the parking nut part 50 may be restricted.

The cover groove 62 may be formed on the inner surface of the anti-rotation cover 61, and the bolt protrusion 33 formed on the first coupling part 30 may be inserted into the cover groove 62 so as to guide the movement of the anti-rotation cover 61. That is, the cover groove 62 formed in the longitudinal direction of the anti-rotation cover 61 may be extended to the end of the anti-rotation cover 61, and the bolt protrusion 33 may be inserted into the cover groove 62 so as to suppress the anti-rotation cover 61 from swaying, while the anti-rotation cover 61 covers the first coupling part 30. When the bolt protrusion 33 is locked to an end of the cover groove 62, the movement of the anti-rotation cover 61 may be restricted.

The cover hole 63 may be formed at an end of the anti-rotation cover 61, and the nut protrusion 53 formed on the parking nut part 50 may be inserted into the cover hole 63. At this time, the cover groove 62 and the cover hole 63 may be formed on a straight line or different lines. The nut protrusion 53 may be forced to be coupled to the cover hole 63. At this time, a plurality of nut protrusions 53 may be arranged to maintain the connection state with the cover hole 63, or formed of an elastic material. For example, the nut protrusion 53 may include a protrusion body 531 and a protrusion head 532. The protrusion body 531 may protrude from the nut body 51 so as to be inserted into the cover hole 63, and the protrusion head 532 may be formed at an end of the protrusion body 531 so as to be contacted with the anti-rotation cover 61.

The cable fixing groove 65 may be formed in a hole shape passing through the anti-rotation cover 61, and one end of the releasing cable 70 may be detachably connected to the cable fixing groove 65.

The operation principle and effect of the assembly device for a parking cable in accordance with the embodiment of the present invention will be described as follows.

The left end of the driving cable part 10 may be connected to the driving unit 100, and the right end of the driving cable part 10 may be connected to the first coupling part 30. The right end of the braking cable unit 20 may be connected to the braking unit 200, and the left end of the parking cable unit 20 may be connected to the parking locking part 40. At this time, parking cable unit 20 may maintain the connection state with the parking locking part 40 through the parking nut part 50 (refer to FIG. 1).

In the above-described state, the first coupling part 30 may be inserted into the parking nut part 50 so as to be screw-coupled to the parking nut part 50 (refer to FIG. 2). At this time, the parking nut part 50 may be rotated to reduce the length (a) of the parking cable. Then, an invalid stroke for assembling the parking cable may be removed (refer to FIG. 3).

When the first coupling part 30 and the parking nut part 50 are completely coupled, the anti-rotation part 60 through which the driving cable part 10 is passed may be moved to surround the first coupling part 30 and the parking nut part 50 (refer to FIG. 4). The anti-rotation part 60 may be guided along the bolt protrusion 53, and coupled to the nut protrusion 53 so as to restrict the rotations of the first coupling part 30 and the parking nut part 50.

When the parking nut part 50 is rotated according to the design plan, the anti-rotation part 60 and the bolt protrusion 53 may be coupled to each other. For example, when an operator rotates the parking nut part 50 twice by mistake in a state where the parking nut part 50 is designed in such a manner that it is rotated three times to correct an invalid stroke, the parking nut part 50 may not reach the anti-rotation part 60.

Furthermore, when the operator rotates the parking nut part 50 four times by mistake, the bolt protrusion 53 may not be locked to the end of the cover groove 62 of the anti-rotation part 60, and then moved in the longitudinal direction. When such an assembling error occurs, the operator may couple the anti-rotation part 60 and the bolt protrusion 53 by adjusting the rotation direction and rotation number of the parking nut part 50, and correct an invalid stroke according to the design plan.

Figure 10:
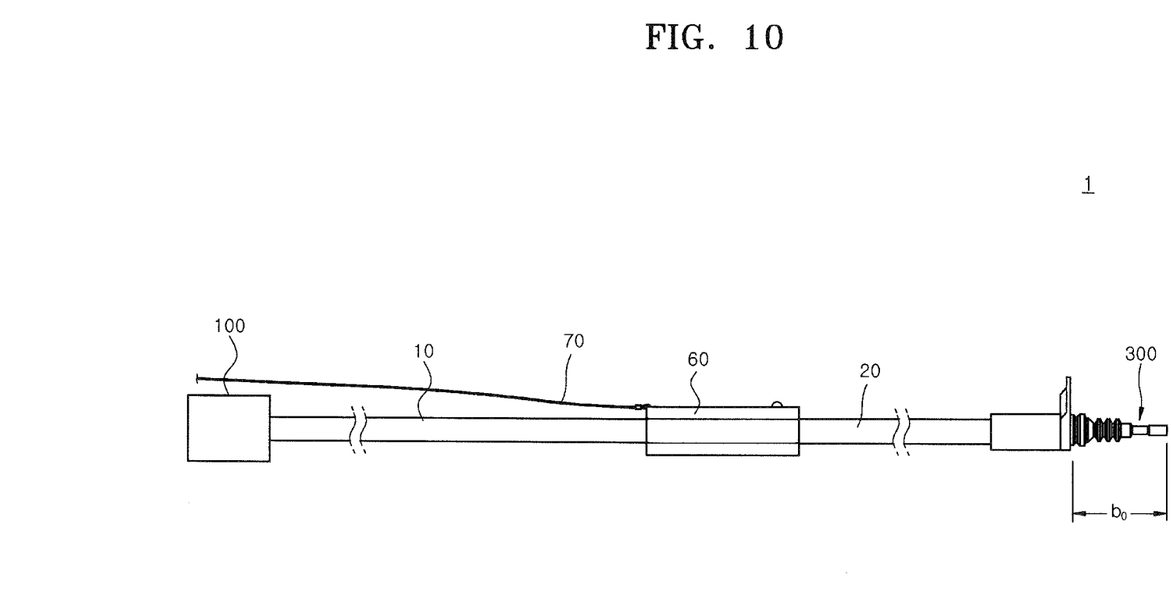
FIG. 10 illustrates a state before a releasing cable is operated in the assembly device for a parking cable in accordance with the embodiment of the present invention.
Figure 11:
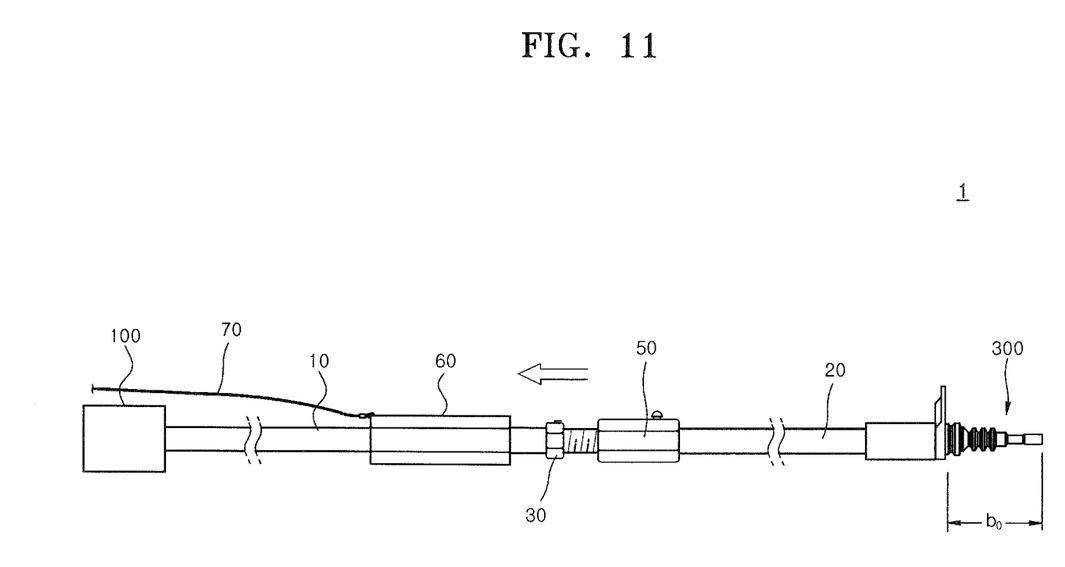
FIG. 11 illustrates a state in which the anti-rotation part is moved by the releasing cable in the assembly device for a parking cable in accordance with the embodiment of the present invention.
Figure 12:
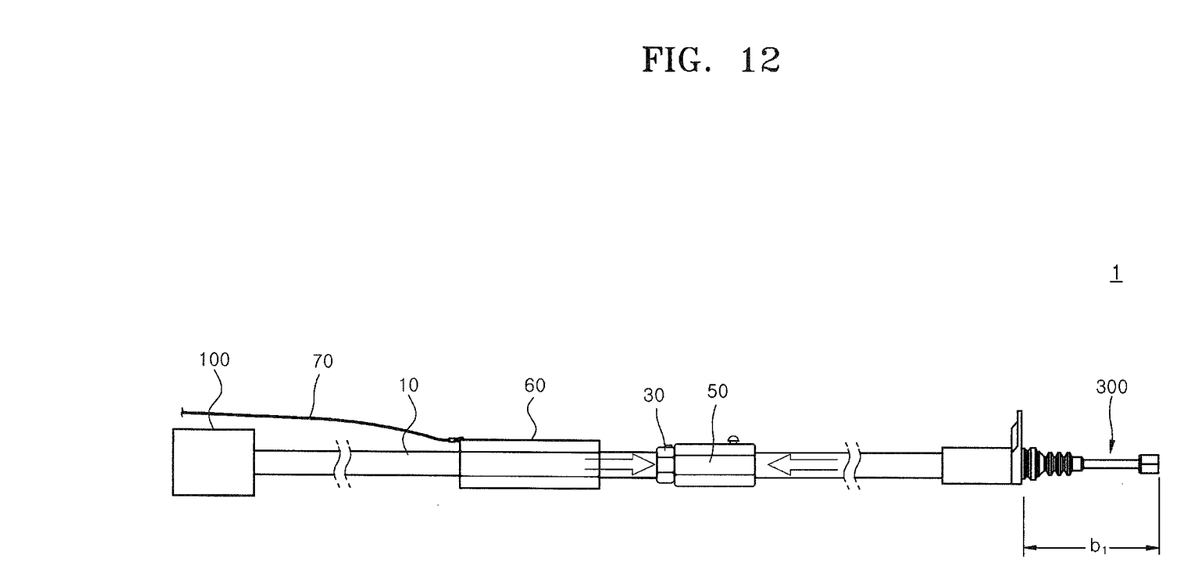
FIG. 12 schematically illustrates a state in which a braking force is released in the assembly device for a parking cable in accordance with the embodiment of the present invention.

FIG. 10 illustrates a state before the releasing cable is operated in the assembly device for a parking cable in accordance with the embodiment of the present invention. FIG. 11 illustrates a state in which the anti-rotation part is moved by the releasing cable in the assembly device for a parking cable in accordance with the embodiment of the present invention. FIG. 12 schematically illustrates a state in which a braking force is released in the assembly device for a parking cable in accordance with the embodiment of the present invention.

Referring to FIGS. 10 to 12, when the releasing cable 70 connected to the anti-rotation part 60 is pulled in case where the vehicle is discharged or the parking brake is broken down, the anti-rotation part 60 may be separated from the first coupling part 30 and the parking nut part 50.

An inner cable 300 positioned at the inside of the driving cable part 10 and the braking cable part 20 may be pulled by the driving unit 100 in a braking state. Thus, a force to couple the first coupling part 30 and the parking nut part 50 may be applied to the driving cable part 10 and the braking cable part 20 by a reaction force to the force of the driving unit 100 to pull the inner cable 300 in the braking state.

Thus, when the releasing cable 70 is pulled to move the anti-rotation part 60 (refer to FIG. 11), the rotation restriction between the first coupling part 30 and the parking nut part 50 may be released, and the first coupling part 30 and the parking nut part 50 may be rotated and screw-coupled to each other (refer to FIG. 12). Thus, the protrusion of the inner cable 300 may be increased (b0→b1), and the force having pulled the braking unit 200 may be reduced to release the braking force.

In the assembly device 1 for a parking cable in accordance with the embodiment of the present invention, the first coupling part 30 connected to the driving cable part 10 and the parking nut part 50 connected to the braking cable part 20 may be screw-assembled to adjust the length (a) of the parking cable.

In particular, since the driving cable part 10 and the braking cable part 20 are separated from each other, it is possible to improve the workability of an operator who couples the driving cable part 10 to the driving unit 100 or couples the driving cable part 20 to the braking unit 200. Furthermore, an invalid stroke may be suppressed to reduce the volume of the module.

In the assembly device 1 for a parking cable in accordance with the embodiment of the present invention, the anti-rotation part 60 may be arranged to surround the parking nut part 50 and the first coupling part 30, thereby substantially preventing the rotations of the parking nut part 50 and the first coupling part 30. Thus, it is possible to substantially prevent the first coupling part 30 and the parking nut part 50 from being loosened by vibration and external impact of the vehicle.

In the assembly device 1 for a parking cable in accordance with the embodiment of the present invention, the rotation number of the parking nut part 50 may be adjusted according to the design plan such that the parking nut part 50 and the anti-rotation part 60 are coupled to each other. Thus, an invalid stroke may be corrected during an assembly process. That is, an operator may adjust the length (a) of the parking cable according to the design plan.

Since the releasing cable 70 is applied to the assembly device 1 for a parking cable in accordance with the embodiment of the present invention, the braking force of the parking brake may be released through a simple operation during emergency.

In the assembly device for a parking cable in accordance with the embodiment of the present invention, the first coupling part connected to the driving cable part and the second coupling part connected to the braking cable part may be screw-coupled to adjust the length of the parking cable.

Furthermore, the anti-rotation part may be arranged to surround the parking nut part and the first coupling part, and substantially prevent the rotations of the parking nut part and the first coupling part.

Furthermore, since the rotation number of the parking nut part is adjusted according to the rotation number of the parking nut part such that the parking nut part is coupled to the anti-rotation part, an invalid stroke may be adjusted during an assembly process.

Furthermore, since the releasing cable is applied, the state of the parking cable may be released through a simple operation.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A parking cable apparatus comprising:
    a first cable extension comprising a first end coupled to a driving unit and a second end;
    a second cable extension comprising a first end coupled to a braking unit and a second end;
    a bolt fixed to the second other end of the first cable extension and comprising a head and threads;
    a nut coupled to the second end of the second cable extension such that the nut is rotatable about an axis of the second cable extension relative to the second cable extension; and
    a cap coupled to the first cable extension such that the cap slides along the first cable extension relative to the bolt while being coupled with the first cable extension,
    wherein the nut is configured to engage with the threads of the bolt such that the first cable extension and the second cable extension are mechanically connected via the bolt and nut that are engaged,
    wherein the nut is rotatable relative to the head of the bolt when the nut is engaged with the threads of the bolt,
    wherein the cap is configured to engage with the head and further configured to engage with the nut such that the nut becomes no longer rotatable relative to the head of the bolt when the cap engages with both the head and the nut.

2. The device of claim 1, wherein the cap is configured to engage with the nut only when the nut is located at a predetermined location relative to the head.

3. A parking cable device, comprising:
    a driving cable part having one end connected to a driving unit;

a braking cable part having one end connected to a braking unit;
a first coupling part coupled to the other end of the driving cable part; and
a second coupling part coupled to the other end of the braking cable part and screw-coupled to the first coupling part,
wherein a distance between the other end of the driving cable part and the other end of the braking cable part is adjusted according to the extent to which the first and second coupling parts are screwed coupled to each other,
wherein the first coupling part comprises:
a bolt body coupled to the driving cable part and having a screw thread formed on the outer surface thereof; and
a bolt head formed on the bolt body so as to protrude in a lateral direction, and having a polygonal shape,
wherein the second coupling part comprises:
a parking locking part coupled to the other end of the braking cable part; and
a parking nut part to which the parking locking part is locked and fixed, and into which the first coupling part is inserted and screw-coupled, and
a distance between the parking nut part and the driving cable part is adjusted according to the rotation direction of the parking nut part.

4. The device of claim 3, further comprising an anti-rotation part engaged with the first coupling part and the parking nut part so as to restrict the rotation of the parking nut part.

5. The device of claim 4, wherein the anti-rotation part has a releasing cable connected thereto.

6. The device of claim 5, wherein the anti-rotation part comprises:
an anti-rotation cover through which the driving cable part is passed, and which is arranged to surround the first coupling part and the parking nut part;
a cover groove which is formed on the inner surface of the anti-rotation cover, and into which a bolt protrusion formed on the first coupling part is inserted to guide the movement of the anti-rotation cover; and
a cover hole which is formed at an end of the anti-rotation cover, and into which a nut protrusion formed on the parking nut part is inserted.

7. The device of claim 3, wherein the parking locking part comprises:
a locking body coupled to the braking cable part and inserted into the parking nut part; and
a locking head formed on the locking body so as to protrude in a lateral direction, and locked to the inner surface of the parking nut part.

8. The device of claim 7, wherein the parking nut part comprises:
a nut body through which the braking cable is passed, of which the outside is formed in a polygonal shape, and of which the inside is screw-coupled to the first coupling part; and
a locking protrusion protruding from the inner surface of the nut body, and locked to the locking head.

9. A parking cable device, comprising:
a driving cable part having one end connected to a driving unit;
a braking cable part having one end connected to a braking unit;
a first coupling part coupled to the other end of the driving cable part; and
a second coupling part coupled to the other end of the braking cable part and screw-coupled to the first coupling part,
wherein a distance between the other end of the driving cable part and the other end of the braking cable part is adjusted according to the extent to which the first and second coupling parts are screwed coupled to each other,
wherein the second coupling part comprises:
a parking locking part coupled to the other end of the braking cable part;
a parking nut part to which the parking locking part is locked and fixed, and into which the first coupling part is inserted and screw-coupled, and
a distance between the parking nut part and the driving cable part is adjusted according to the rotation direction of the parking nut part.

10. The device of claim 9, further comprising an anti-rotation part engaged with the first coupling part and the parking nut part so as to restrict the rotation of the parking nut part.

11. The device of claim 10, wherein the anti-rotation part has a releasing cable connected thereto.

12. The device of claim 11, wherein the anti-rotation part comprises:
an anti-rotation cover through which the driving cable part is passed, and which is arranged to surround the first coupling part and the parking nut part;
a cover groove which is formed on the inner surface of the anti-rotation cover, and into which a bolt protrusion formed on the first coupling part is inserted to guide the movement of the anti-rotation cover; and
a cover hole which is formed at an end of the anti-rotation cover, and into which a nut protrusion formed on the parking nut part is inserted.

13. The device of claim 12, wherein the cover groove is formed in the longitudinal direction of the anti-rotation cover.

14. The device of claim 12, wherein the nut protrusion comprises:
a protrusion body protruding from the parking nut part and inserted into the cover hole; and
a protrusion head formed at an end of the protrusion body, and contacted with the anti-rotation cover.

15. The device of claim 12, wherein the nut protrusion is formed of an elastic material, and forced to be inserted into the cover hole.

16. The device of claim 12, wherein the anti-rotation cover, the cover groove, and the cover hole are integrated with each other.

17. The device of claim 12, wherein the anti-rotation part further comprises a cable fixing groove which is concavely formed in the anti-rotation cover and to which the releasing cable is coupled.

18. The device of claim 17, wherein the releasing cable is detachably coupled to the cable fixing groove.

19. The device of claim 9, wherein the parking locking part comprises:
a locking body coupled to the braking cable part and inserted into the parking nut part; and
a locking head formed on the locking part so as to protrude in a lateral direction, and locked to the inner surface of the parking nut part.

20. The device of claim 19, wherein the parking nut part comprises:

a nut body through which the braking cable is passed, of which the outside is formed in a polygonal shape, and of which the inside is screw-coupled too the first coupling part; and a locking protrusion protruding from the inner surface of the nut body, and locked to the locking head.

* * * * *